United States Patent [19]

Day

[11] 4,113,985

[45] Sep. 12, 1978

[54] MINE DIAL AND PAGE PHONE SYSTEM

[75] Inventor: Paul B. Day, Reading, Pa.

[73] Assignee: Gai-Tronics Corporation, Reading, Pa.

[21] Appl. No.: 756,238

[22] Filed: Jan. 3, 1977

Related U.S. Application Data

[63] Continuation-in-part of Ser. No. 585,304, Jun. 9, 1975, abandoned.

[51] Int. Cl.² .............................................. H04M 1/18
[52] U.S. Cl. ............................... 179/2 R; 179/16 EC; 179/1 H; 179/27 G; 179/81 R
[58] Field of Search ............... 179/2 A, 1 H, 18 AD, 179/18 BF, 1 R, 2 R, 4, 16 EC, 27 G, 81 R, 84 T, 99

[56] References Cited

U.S. PATENT DOCUMENTS

| | | | |
|---|---|---|---|
| 2,339,438 | 1/1944 | Thompson | 179/16 EC |
| 3,553,386 | 1/1971 | Golembeski | 179/84 T |
| 3,576,401 | 4/1971 | Saxon | 179/18 BF |
| 3,854,012 | 12/1974 | Chambers, Jr. | 179/18 AD |
| 4,064,366 | 12/1977 | Wheatley et al. | 179/81 R |

FOREIGN PATENT DOCUMENTS 1,384,392  2/1975  United Kingdom ............... 179/1 H

*Primary Examiner*—Kathleen H. Claffy
*Assistant Examiner*—Kenneth A. Chayt
*Attorney, Agent, or Firm*—William J. Ruano

[57] ABSTRACT

This invention relates to a contemporary paging type telephone for use in coal mines, with an added dial feature to work in conjunction with a local telephone switchboard or central telephone office switchboard. It provides the features of a contemporary single channel paging telephone system with the additional advantages of:

1. Multiple private line conversations
2. Localized paging via dial system—calling party can name the person being called, avoiding confusion;
3. All-station paging ability to locate roving personnel.

The mine dial/page phone has a rotary dial adaptation and loudspeaker paging facility and is connected to an above-ground conventional telephone line by means of an interface device, also above ground. The interface, one for each line, renders the telephone dialing system permissible for use in coal mines. The interface also provides, automatically, the emergency function required to support communications should there be a failure of telephone switchboard or central office service.

8 Claims, 8 Drawing Figures

D.C. POWER TRANSFER

MINE DIAL AND PAGE PHONE SYSTEM

This is a "continuation-in-part" of application Ser. No. 585,304, filed June 9, 1975, now abandoned.

This invention relates to a novel telephone communication system which enables the use of a paging dial telephone in coal mines and the like without the disadvantage of safety hazards inherent in conventional dial telephone systems. Another disadvantage of using conventional dial telephone systems in such mines is the difficulty in locating roving personnel.

A disadvantage of using conventional single channel non-dialing page phones is that when a conversation is taking place over a single channel phone system, it is impossible to carry on another conversation, therefore one conversation ties up the entire system. Another disadvantage of presently used single channel mine page phones is that frequent paging is annoying to people not concerned with the page call, but who are working near a station, resulting in reduced attentiveness to all page calls.

An object of the present invention is to provide a novel mine dial/page phone system which is useful in deep mines and the like and which overcomes the above-named disadvantages of existing systems.

A more specific object of the present invention is to provide a private line local paging feature to call the desired person by name, also to provide an all-page dialing feature for locating roving personnel.

And a still further object of the present invention is to automatically provide emergency page/party merge feature for use during dial telephone switchboard system failure.

Still another object is to provide a telephone system as described and having a permissible rating for use in gassy coal mines.

Other objects and advantages will become more apparent from a study of the following description taken with the accompanying drawings wherein:

FIGS. 1a and 1b comprise a circuit diagram of a mine dial/page phone system used in the present invention;

Figure 5:
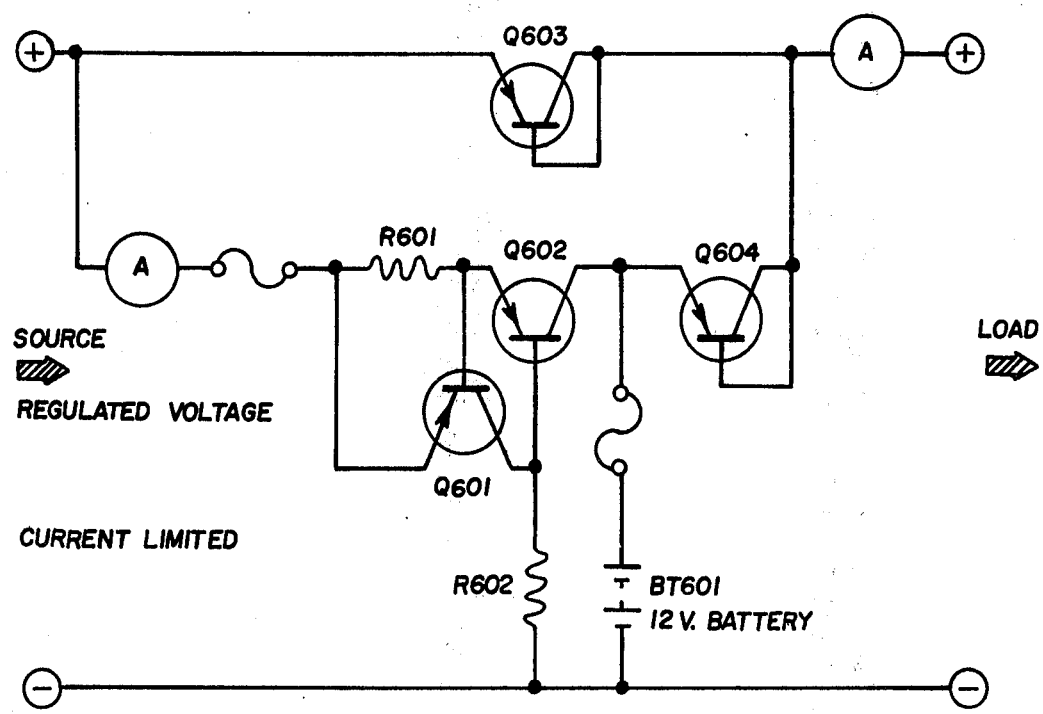
Figure 4A:
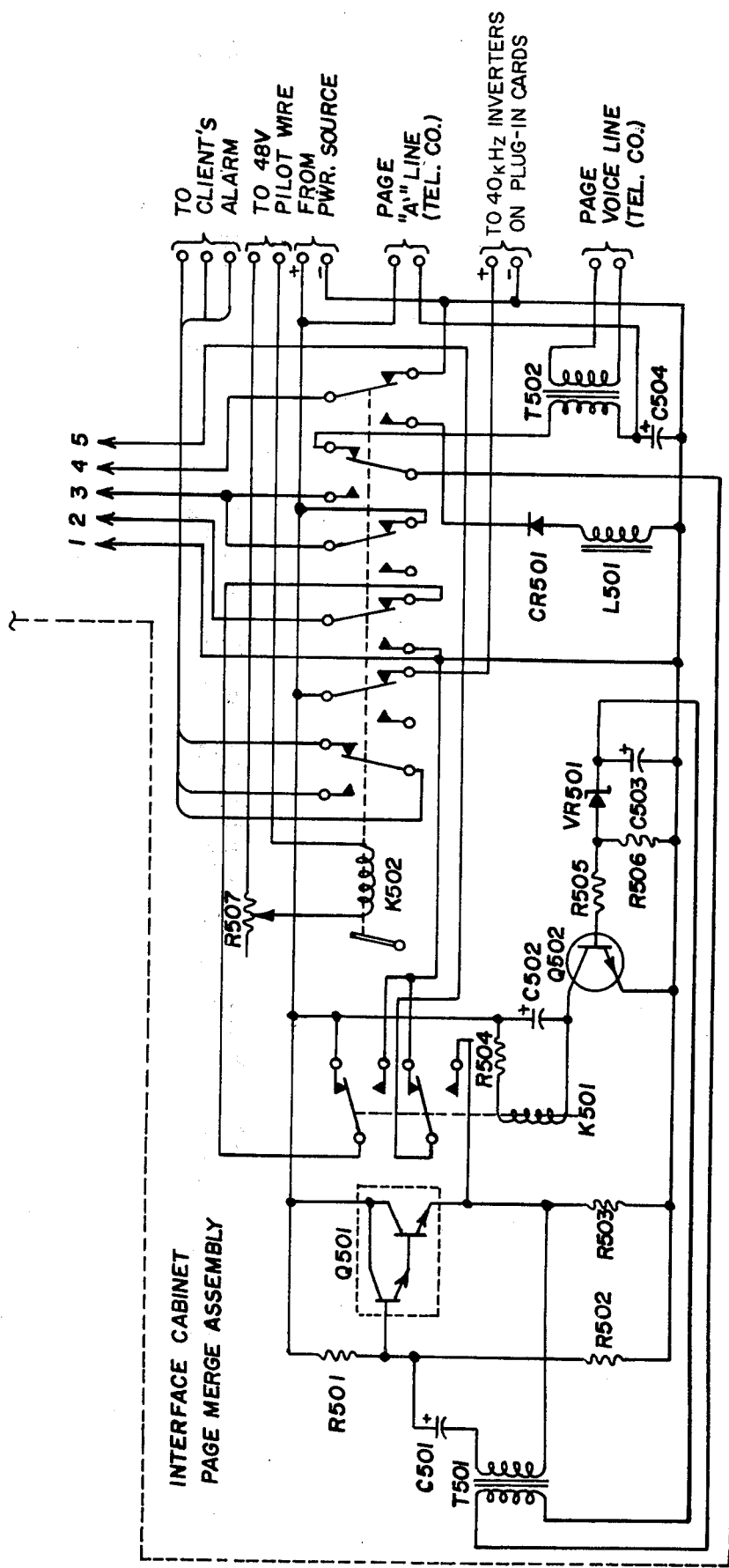
Figure 4B:
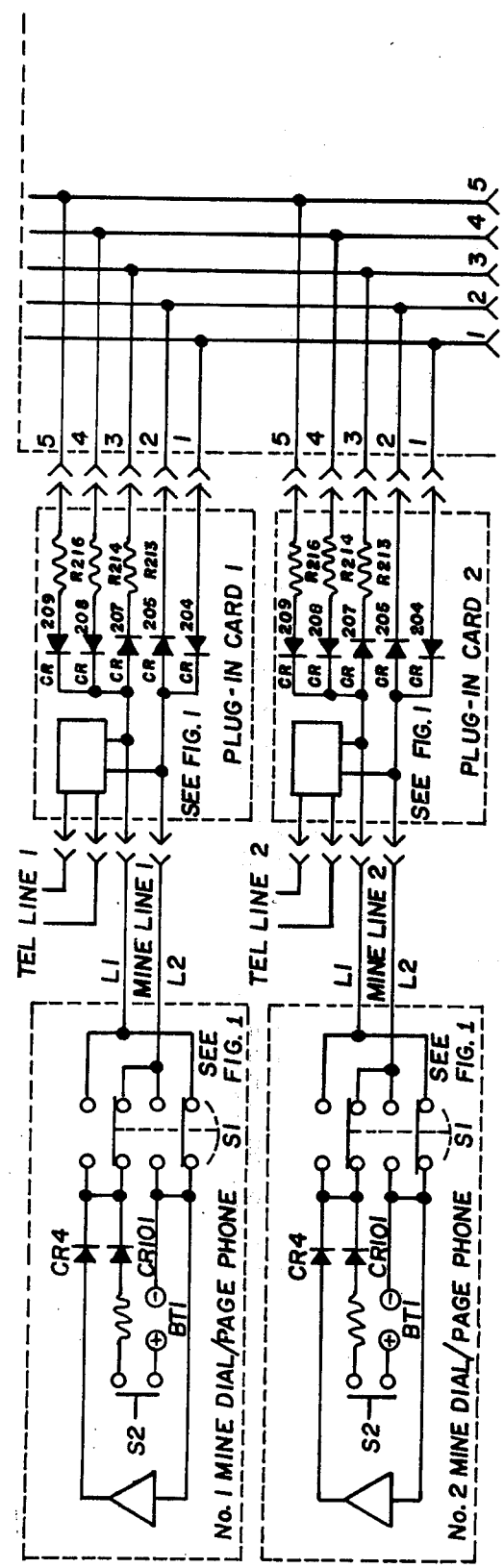
Figure 6:
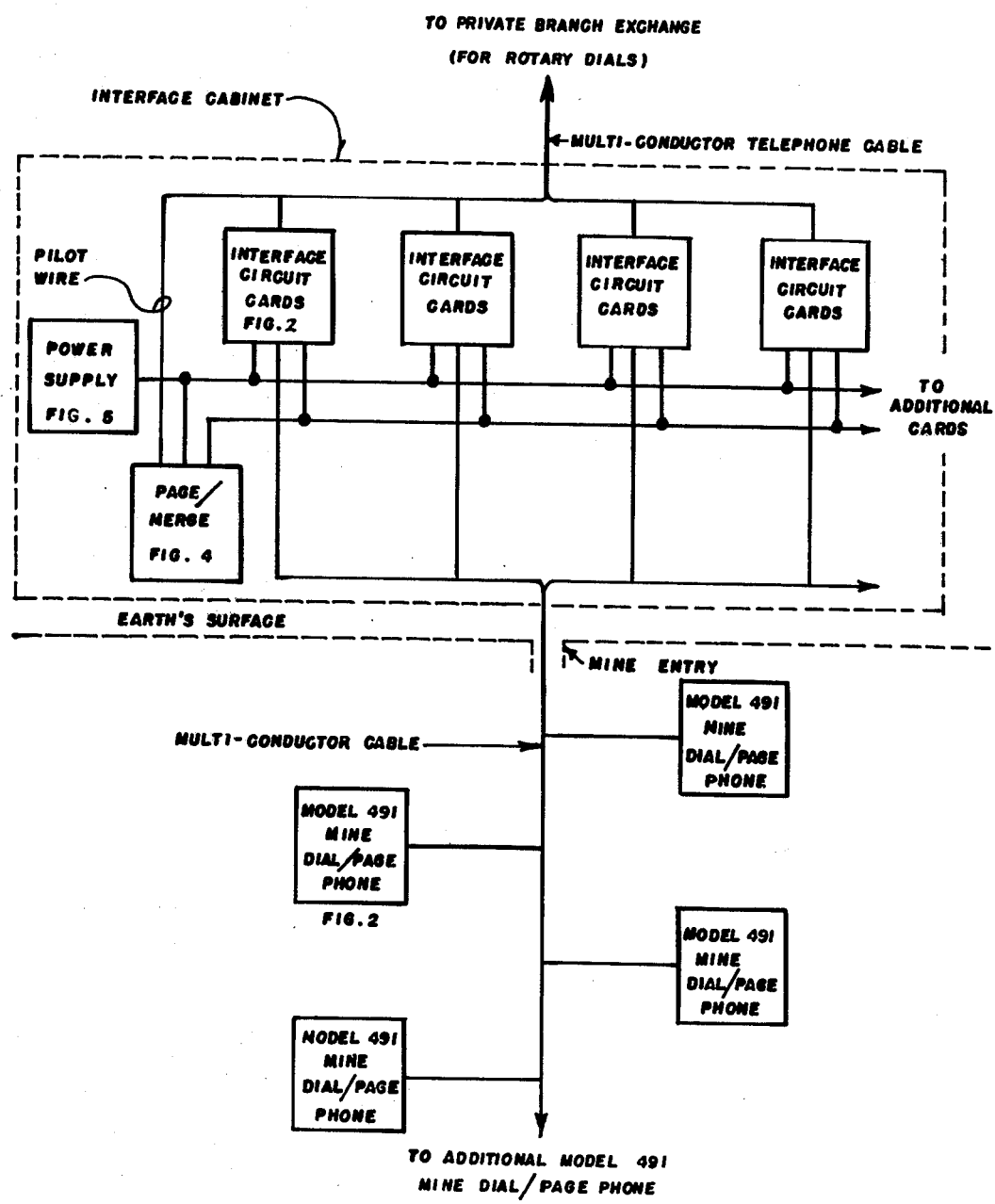

FIGS. 4a and 4b comprise a circuit diagram of the page/merge plug-in module associated with the interface cabinet and showing simplified interconnection with the interface cards, mine dial/page phone and telephone lines;

FIG. 5 is a circuit diagram of the D.C. power transfer element in the interface cabinet showing a source of emergency 12 volt supply; and, FIG. 6 is a line diagram of the overall system interconnection.

To avoid needless repetition in the description of the elements of the circuit, numbers preceeded by Q denote transistors, by R, resistors, by C, capacitors, by CR, diodes singly or in bridge switch circuits, and by S, switches.

Generally stated, the dial/page telephone communications system for coal mines embodying the present invention provides unique paging arrangements in addition to ring-in and dial-out procedures.

The system is connected to a conventional telephone switchboard and is designed to operate with rotary dial switchboards but with modification can be operated with tone dial switchboards. The system as provided is intrinsically safe at all times for use in methane gas and coal dust.

A special feature reverts the system into the now standard single channel page or party mode should there be a telephone cable severance between the system and the private branch exchange switchboard to which the system is connected, or should there be a power failure at that switchboard.

The efficiency of this system is enhanced by its ability to support many simultaneous conversations while still retaining the paging feature found in most mine phone in use today. One new feature of this telephone is a special paging feature which allows the calling party to page through a loudspeaker for a 36 second period following a 4 second alert tone. The caller can, for instance, call the desired person by name and thereby avoid confusion concerning who answers the call. It is also possible to page all telephones by dialing a special all-station page number and the caller can be heard from all loudspeakers or through any handsets that may be in use.

Operation of the dial/page telephone communications system of the present invention is as follows:

RING-IN, LOCAL PAGE

A ringing signal of 85 or more volts A.C. at a frequency of 20 cycles is applied to the telephone line by the private branch exchange to which it is connected. This step is identical to that of a standard telephone.

Because the telephone ringing signal is 85 volts or more, and because the line is terminated at the switchboard to two inductors which can release sufficient energy into the line to cause sparking, the line is classified as non-permissible for use in gassy coal mines. It is therefore necessary to alert the desired person by another means such as an alert signal followed by a page. This is described as follows:

The 20 cycle ringing signal is fed from the telephone line to the interface circuit through a diode bridge switch CR212 (FIG. 2) which orients the line current in a direction that can be handled by Q207 and Q208. Signal current passes through CR212, VR203 and R229. This turns on Q208 which passes current through R231 and U202a. The 20 cycles A.C. becomes 40 cycles pulsating D.C. by virtue of the bridge switch. An optical coupler, U202, is used to transfer the 40 cycle D.C. pulses from the telephone line circuitry to the mine line circuitry. These new direct current pulses are integrated into a steady D.C. voltage by a threshold and integrating circuit, C203, R209, R210, R211 and threshold diode CR203. This turns on Q203 which passes power to two timing circuits. These two timing circuits and a ring tone generator, made up of two dual operational amplifiers, AR201 and AR202, are set into operation by the triggering action of the threshold circuit through switch Q203. The first timing circuit, AR201a, R205, C201, adjusted for 40 seconds, keeps power maintained to the timer through Q205, CR206, R209, R210 and CR203, thereby latching Q203 on.

The first timing circuit also applies paging bias to the mine line by way of Q205 and Q204 circuitry, so that the associated mine dial/page phone is switched electronically to the paging mode. Q205 supplies emitter-base current to Q204 and base current from Q204 flows through R206 into the base of Q201 so that Q204 and Q201 are turned on. Q204 collector passes page bias current to the mine line L2 by way of R212 and T201 winding. Q201 collector causes current to flow through U201a diode and R201, U201a emits light causing U201b to turn on thereby supplying base current to Q207, turning it on which causes telephone line current to flow from the switchboard through CR212, Q207, T201 winding and back to the switchboard. The telephone line is now seized and the switchboard no longer provides ringing signal. The telephone line remains seized for the remainder of the 40 second timed period or until answered and the line then remains seized as described under "ORIGINATING A CALL".

Simultaneously with the first timing circuit, power is applied to a second timing circuit, AR201b, R215, C205 and C206, adjusted for 4 seconds, which applies power to a ring tone generator consisting of the second dual operational amplifier AR202 with its associated circuitry.

The ring tone generator consists of a square-wave oscillator AR202b, R233, R235 and C213, operating at a base frequency of 1450 cycles. A second square-wave generator, AR202a, R222, R223 and C210, operating at a frequency of 20 cycles, modulates the first generator through R224, R225, Q206 and C212, so that its frequency varies between 1450 cycles and 1150 cycles at a 20 cycle rate by virtue of the switching action of Q206 applying and removing C212 to and from the timing circuit, thus changing its frequency at a 20 cycle rate. This ring tone is applied to the mine line through R234, C214 and C215, for a period of 4 seconds and can be heard distinctly by the outside calling party by way of transformer T201. Following the 4 second ring tone the mine dial/page phone is held in the paging mode by the first timer, AR201a, for the balance of the 40 seconds, allowing the calling party to make his page, or until someone accepts the call by squeezing the press-bar on the handset of the mine dial/page phone, which then supplies current through CR201 through base-emitter junction of Q201, through base-emitter junction of Q202 and then returning to the mine line through T201 winding. Q202 is thereby turned on, shorting out the bias current to Q203, turning it off which then disables the timing circuitry. At this time line seizure is maintained by mine phone line circuit and operation is as described under "ORIGINATING A CALL".

ORIGINATING A CALL

To dial out, the user of the mine dial/page phone squeezes the press-bar located in the center of the handset handle. This constitutes an "off hook" condition and the familiar dial tone will be heard. Regular dialing procedure will then be followed until the call is completed. Releasing the press-bar on the handset returns the station to an "on hook" condition.

Figure 1A:
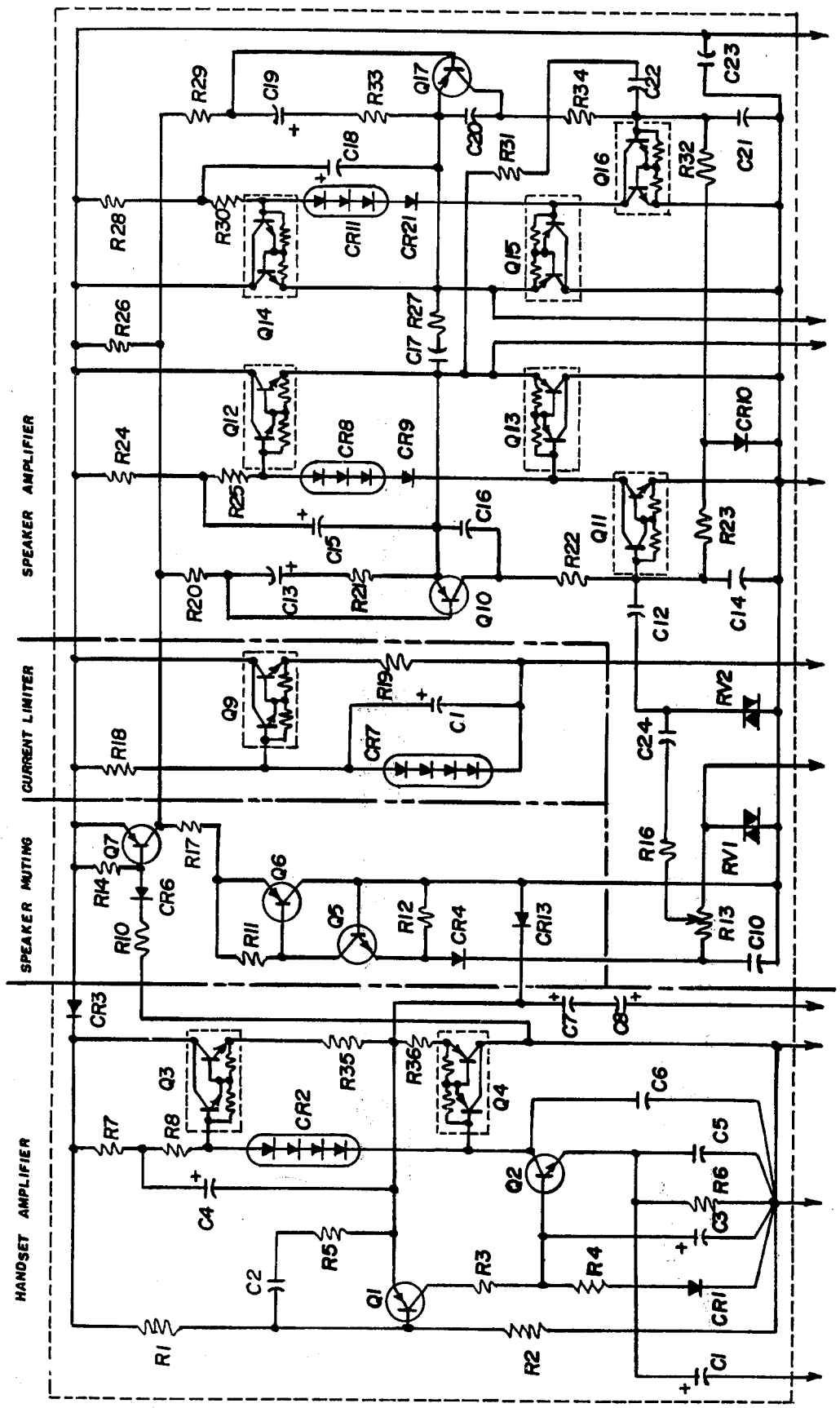
Figure 1B:
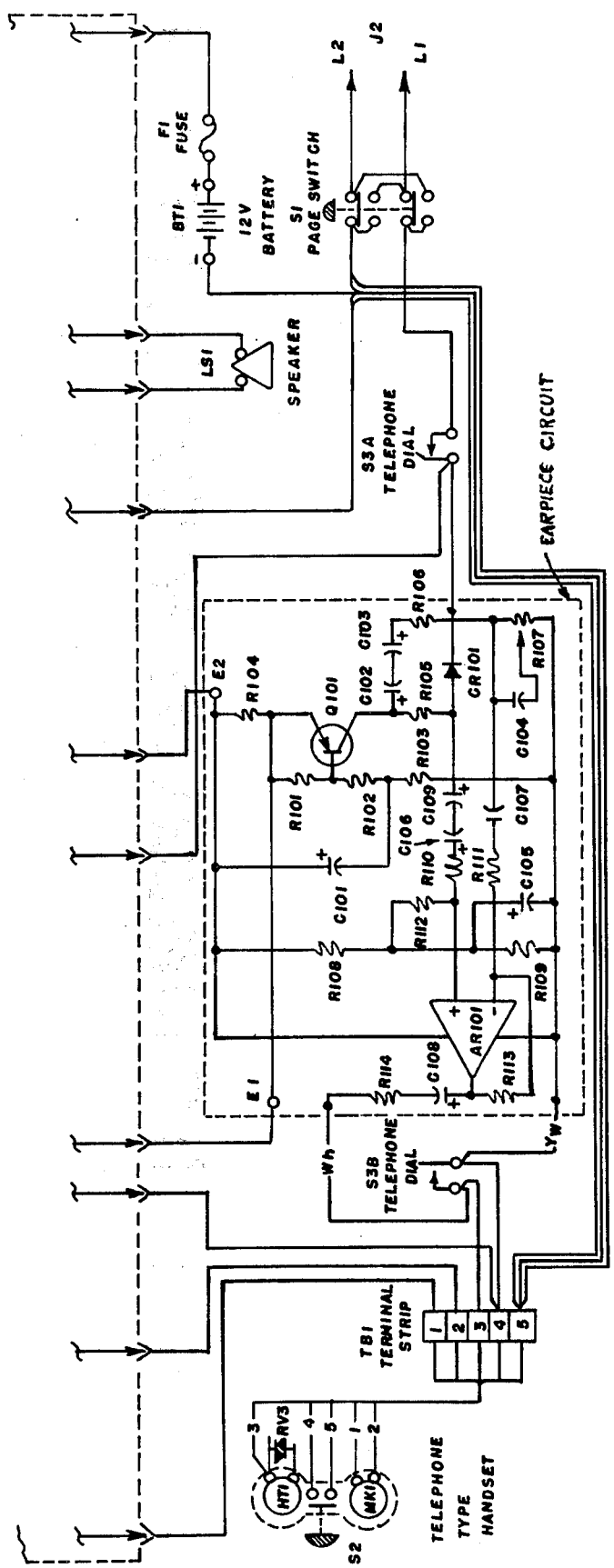

FIGS. 1a and 1b connected together, that is, with the bottom arrows of FIG. 1a connected to the corresponding top arrows of FIG. 1b, show the mine dial/page telephone of the present invention. FIG. 1a is the electronic portion of a contemporary mine page phone and is disclosed in U.S. Pat. No. 3,909,547 dated Sept. 30, 1975; deletion of parts Q8 and R15 in the Speaker Muting section of the present invention, FIG. 1A, cause the speaker amplifier to respond to only one polarity of page bias applied to the mine line.

Squeezing the press-bar S2 on the handset (HT1-MK1 FIG. 1b) can be likened to lifting the handset from a regular desk telephone, and so can be considered to be in the "off hook" condition. S2 connects earpiece circuitry (FIG. 1b) to battery negative. Bias current is applied to Q101, by way of R103 and R102, turning it on, which causes approximately 10 milliamperes and 10 volts to be impressed upon the mine line by the mine dial/page phone. This current flows from the battery BT1, through fuse F1, through the current limiter (FIG. 1a), through R104, Q101, R105, CR101, through normally closed pulser contacts, S3A, of dial, page switch S1 and the mine line L1 (FIG. 1b). The current then flows through diode CR201 of an interface card (FIG. 2), through base-emitter of Q201, turning it on, thereby passing current through R201 and the light-emitting diode portion of an optical coupler, U201, causing the transistor portion of U201 to turn on, passing current through R240 which switches on a high voltage transistor, Q207, thereby passing telephone switchboard current through diode bridge CR212 and transformer T201 which all together acts to seize the telephone line. From base-emitter of Q201 the mine line current goes through base-emitter of Q202 through T201 winding and then flows back through the mine line L2 and returns to the battery negative terminal by way of terminal 5 of terminal block TB1 (FIG. 1b). While current is going through base-emitter of Q202 it is turned on and all timing functions are disabled because bias current for Q203 is shorted out by Q202 so that Q203 cannot turn on the timer circuits.

Assuming this mine phone is originating the call, a dial tone sent out by the PBX board through the seized telephone line will be heard while squeezing the press-bar switch S2.

When operating the dial, normally closed pulser switch S3A sets up a series of off-on voltage/current control pulses in the mine line relative to the digit dialed in the sequence and method described above. Transistor switch Q207 causes a time duplication of these pulses to occur in the higher powered telephone line current flowing through the switchboard which in turn establishes connections to another telephone line.

Because the telephone voltage is normally 48 volts and because the line is terminated at the switchboard to two inductors which can release sufficient energy into the line to cause sparking, the line is classified as nonpermissible for use in gassy coal mines. Since the permissible signals coming from the mine dial/page phone are not compatable with present day telephone switchboards it becomes necessary to translate the permissible signals from the mine dial/page phone into signals acceptable to the switchboard.

Figure 2:
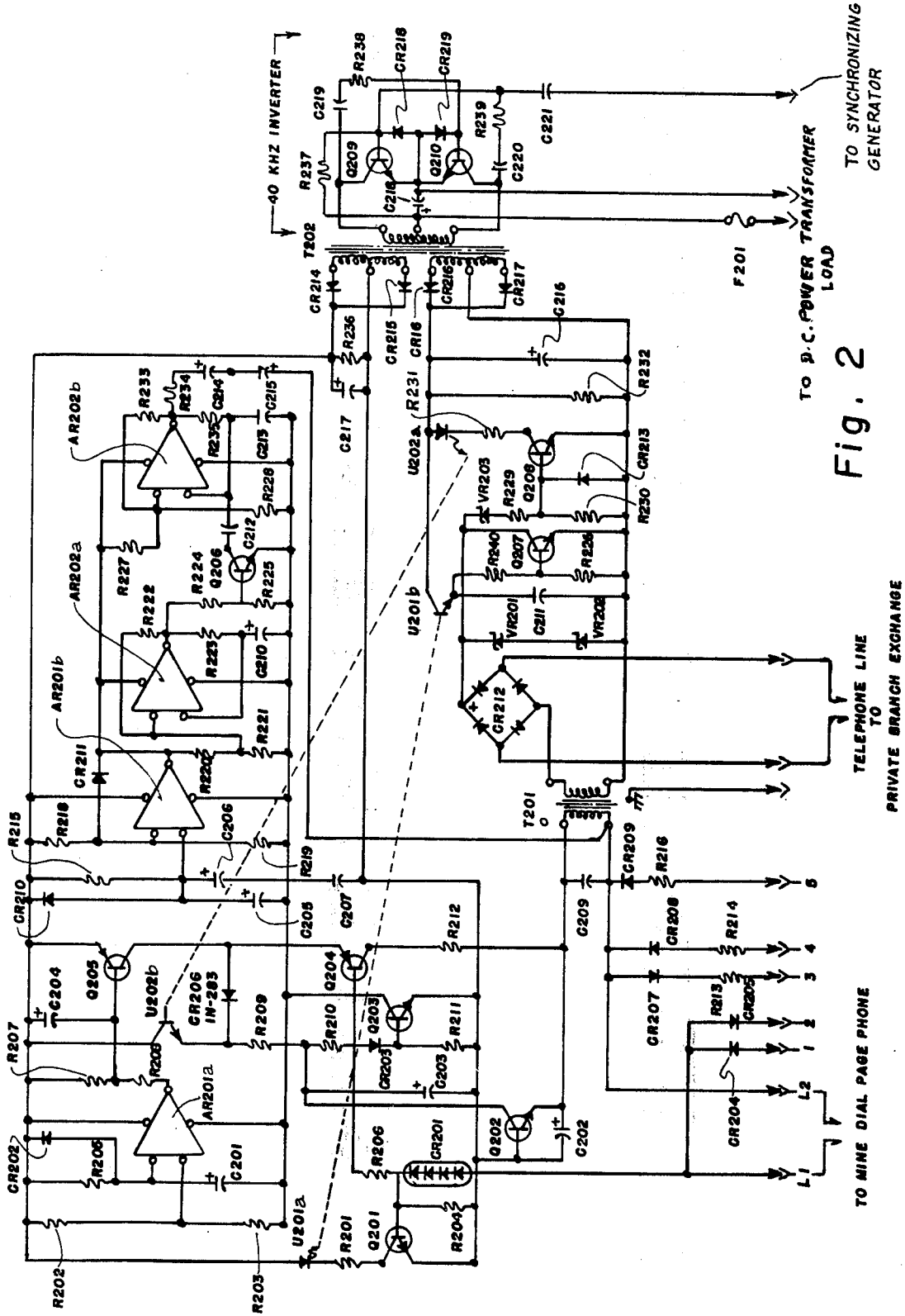
FIG. 2 is a circuit diagram of the interface card used in the interface cabinet.

After telephone line connections are completed, voice signals are transferred between the mine line and telephone line by way of a coupling transformer, T201 (FIG. 2).

The mine dial/page phone has additional circuitry over and above a conventional mine page phone, the important feature being an anti-sidetone circuit which gives an improvement of signals received over extended long lines. Voice signals from the microphone are amplified by the handset amplifier (FIG. 1a) and sent to the special anti-sidetone circuit (FIG. 1b), into the emitter of Q101 by way of E1. The signal current coming from the collector of Q101 is fed to R105 and R106 so that part of the signal current goes out to the mine line through CR101 and part goes to a balancing circuit R107 and C104. Blocking capacitors C102 and C103 keep direct current from flowing through the balance circuit. When the balancing circuit is properly adjusted to approximate the line impedance, equal signal voltages appear across the mine line and the balance circuit.

Since the signal going to the line also goes to the non-inverting input of an operational amplifier, AR101, and the signal for the balance circuit also goes to the inverting input, and because the two signals are approximately equal, the output of the amplifier AR101 will be free of the signal from the microphone. This amplifier output is connected through C108 and R114 to the earpiece, and because the signal from the microphone is balanced out as described, the user will not hear his own voice in his own earpiece. Voice signals coming in from the interface through the mine line L1 enter only the non-inverting input of the anti-sidetone circuit by way of S1, S3A, CR101 (CR101 being biased on by mine line current from Q101), C109, C106 and R110. The incoming signal is then amplified by the operational amplifier and sent to the earpiece. Not hearing one's own voice, yet being able to hear the other person's voice constitutes by definition sidetone rejection. When dialing out, the normally open dial switch S3B closes whenever the rotary portion of the dial is not in the "at rest" position. S3B then bypasses the receiver current, HT1, so that the user does not hear annoying dial pulses.

INTERFACE DUAL POWER SUPPLY

Figure 3:
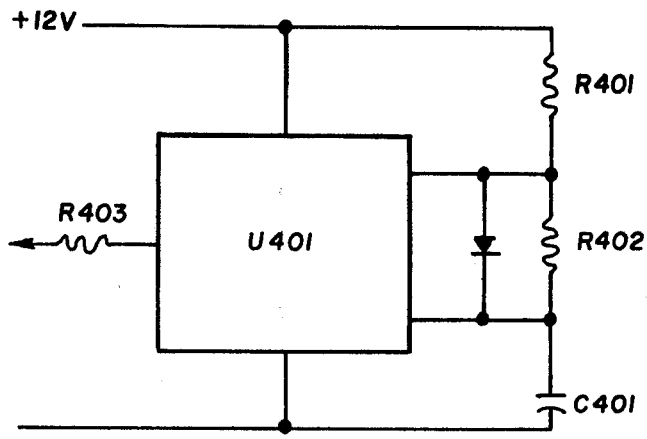
FIG. 3 is a circuit diagram of the square wave generator.

FIG. 3 shows a synchronizing square-wave generator consisting of an integrated circuit timer, U401, timing capacitor C401 and resistors R401 and R402. Only one timer is required for synchronizing all the interface cards of a complete system. R403 couples the timer output to the sync coupling capacitor, C221 (FIG. 2) on each interface card by way of a bus line. On each interface card there is a 40 KHz inverter with two isolated secondary D.C. outputs. One D.C. output is used to power the various semi-conductor switches, optical couplers, timers, etc. related to the mine line circuitry. The other D.C. output is used to power the semi-conductor switches and optical couplers found on the interface card and which are used in relation with the telephone line.

Individual D.C. outputs are required to isolate connections of any one mine line or telephone line from connections of any other mine line or telephone line to prevent cross-talk interference. The 40 KHz inverter on each card is powered by one main power source having a "Battery Back-Up" controlled by a D.C. POWER TRANSFER unit, FIG. 5.

The synchronizing generator locks together all of the 40 KHz inverters to prevent audible beat frequencies from occuring that otherwise might occur as a result of slightly dissimilar inverter frequencies.

ALL-STATION PAGING

FIGS. 4a and 4b taken together by interconnection at plug-in terminals 1 to 5 inclusive show an all-station page-merge device embodying the present invention. A normal condition consists of relay K501 not energized and relay K502 energized. A pilot wire pair contained within the telephone switchboard cable is connected to 48 volts supplied by the switchboard to indicate normal switchboard service by energizing K502.

Assume a normal condition exists with relay K501 open and relay K502 closed. A user of phone 1 can close switch S2, dial a prescribed number which results in the closing of an "A" contact provided by the telephone company. Current flows from positive of the power source through the "A" contact, T502 winding, K502 contact T501 winding, diode VR501 and resistor R505, causing transistor Q502 to actuate relay K501. Voice signals transmitted from phone 1 through card 1 and to telephone line 1 are properly switched by the switchboard to a "VOICE LINE" coming from the telephone company switchboard which connects to an isolation transformer T502 and to transformer T501 which drives transistor Q501. Q501 is biased in such a way that output emitter is at one-half the supply voltage when no signals are present. Voice signals from T501 are amplified by Q501 and appear superimposed upon the one-half supply voltage found at the emitter of Q501. This D.C. voltage with said superimposed voice signal passes through K501 contact (energized) and on to conductor 5, (see also FIG. 2) through R216 and CR209 of card 2 and from there to phone 2 speaker amplifier by way of S1. The return path for the biased signal is through CR4, S1, CR205, conductor 2, K502 and K501, energized, to the common negative of the power source. Since there are two separate batteries, one in each phone, the common negative of one phone is isolated from the common negative of the other. Therefore, there is no interference between the two phones.

The D.C. bias applied as described above to the speaker amplifier of phone 2 and all other phones not in use causes them to become activated and the signals being fed to them are amplified and can be readily heard from the loudspeakers. The user originating this special call can then make announcements or page specific people. Because these page signals are fed to all mine lines through a coupling resistor R216, any phones in use will hear these page signals through their earpieces instead of their loudspeakers. R216 is selected sufficiently large so that insufficient power is applied to any mine line by amplifier Q501 which otherwise might disrupt connections previously established between any other phones. Other phone conversations cannot by heard by the person making the page because of the diode blocking action and the relatively large size of series resistor R216 in conjunction with the shunting impedance of amplifier Q501. When the page is completed the user releases S2 and telephone line seizure is lost. As a result, contact "A" opens at the switchboard which allows Q502 to de-energize K501, returning the system to a normal state.

SWITCHBOARD SERVICE FAILURE

Assume a telephone switchboard service failure exists. Absence of 48V power from the switchboard causes K502 to drop out and all dialed connections in use at that time are cancelled. Only the logic diodes and associated resistors R16, R14, and R13 on each plug-in card (FIG. 4b) are an active part of this mode of operation and the system becomes a single channel page/-party system.

To make a page during switchboard service failure, the user of phone 1 closes S1 and S2, causing current to flow from battery BT1 through CR101, CR207, R213, conductor 3, contacts of K502, winding of T501, diode VR501 and R505, causing Q502 to actuate K501. The action of this page circuit is identical to that of the dialed page excepting the voice signals are impressed directly upon the diode circuitry by way of CR207, R214 and bus 3 (FIG. 4b) instead of going through a telephone switchboard.

When the page is completed, two or more persons can talk in party line mode by closing their respective S2 switches. Party line current and voice signals then go through CR101, CR205, conductor 2, contacts of K502 (which is not energized) to amplifier common negative.

The return path is through inductor L501, contacts of K502, conductor 4, R214, CR208 and back to the phone. These signals do not activate any loudspeakers because of the blocking action of the other diodes, CR209, CR207 and CR204.

When normal telephone service is restored, K502 is energized and the system returns to normal dial operation automatically. A coal mine emergency has no effect upon the operation of this system and dialing procedures continue in a normal manner, providing the switchboard continues to operate.

POWER LINE FAIURE

It is possible to have a switchboard failure even though there is no power line failure. It is also possible to have a power line failure and not have a switchboard failure if the switchboard is powered from a stand-by battery or a special and separate power line. Therefore, switchboard failure and power line failure are independently considered in this system and are treated separately.

FIG. 5 shows a D.C. power transfer device embodying a conventional voltage regulated and current limited power supply to power the interface circuitry housed in a cabinet above ground. This supply is connected to a standard power line. Should there be a power line failure a stand-by battery will power the interface circuitry for some period of time or until the power failure is corrected. The battery is float charged by a current limited pass transistor Q602, so that it has a full charge for an emergency. When normal conditions exist the power supply is the main source of power for the interface circuitry by way of Q603, a transistor which is connected to work as a rectifier. Little or no current is supplied by the battery and Q604, again a transistor connected to work as a rectifier, is back-biased. Should the power line fail, Q604 passes current from the battery to the load and Q603 is back-biased. The use of germanium power transistors as rectifiers instead of silicon rectifiers contributes to greater efficiency due to the low forward drop of germanium junctions when compared to silicon junctions.

Charging the battery is accomplished as follows: Q602 is turned on by virtue of the base current which flows through R602 to supply negative. Current flows from the source through R601 and Q602 into the battery after the battery has been partially discharged. If the battery calls for a high charge current after being heavily discharged, a high current will try to flow through R601 and Q602 into the battery. If the voltage drop across R601 reaches the "knee" voltage of Q601, Q601 will begin to conduct. The greater the current through R601, the more Q601 will be conducting. As a result, only a limited amount of base current can pass through Q602, the balance going through Q601, thereby limiting the amount of charge going into the battery.

FIG. 6 shows a system block diagram which indicates connections between the equipment located below the earth's surface and that located above.

While specific values of voltage, current, etc. have been given in the above description of the circuitry, it should be particularly noted that they are by way of example only and not limiting, since other values may be equally suitable, as will be apparent to those skilled in the art.

Thus it will be seen that I have provided a highly efficient and versatile multi-channel, dial/page phone system useful in mines and similar underground facilities that may contain a methane or similar explosion-prone atmosphere, which system has the following highly advantageous features:

(a) each underground station is on a separate circuit ready for instant use regardless of other conversations in progress within the system;

(b) when connected to a telephone switchboard through a 12 volt-48 volt interface circuitry card provided for each line, any underground station can call another underground station directly, or call any standard telephone at a surface location, also any underground station can be called from any above-ground standard telephone;

(c) selective paging capability is provided to any single, specific underground station;

(d) a dial/access, all-station paging capability is provided to call personnel not at their normal location, or to alert all underground personnel;

(e) automatic switching to a pushbutton-operated, single channel all page/party line mode is provided in the event of a telephone switchboard power failure or severence of a cable interconnecting the switchboard and the interface cabinet, one of the key components of the mine dial/page phone system;

(f) plug-in electronic assemblies are provided whereever possible to facilitate maintenance and adaptation to changes in mine operations.

While I have illustrated and described a single specific embodiment of my invention, it will be understood that this is by way of illustration only and that various changes and modifications may be contemplated in my invention and within the scope of the following claims.

I claim:

1. An underground telephone communication system for coal mines and other facilities that must be devoid of explosion producing sparks, comprising an above-ground dial telephone system connected to an automatic switchboard, a plurality of completely electronic interface circuit devices, devoid of components which store unsafe levels of electrical energy, connected to said switchboard and also connected to separate underground dial and page phone stations, each of said stations including a loudspeaker, to provide a separate, private line to each of a plurality of said stations to enable simultaneous, separate conversations over said private line between said stations and other underground or above-ground dial telephones, said interface circuit devices, one for each of said private lines, including means for automatically removing the ringing voltage of said above-ground telephone system and transmitting, instead, a relatively lower bias voltage with a superimposed pulsating ringing tone to the desired loudspeaker of any one of said underground stations together with means to enable the calling party to page through said desired loudspeaker following said bias voltage with a superimposed pulsating ringing tone.

2. A system as recited in claim 1 together with means responsive to either a break in a pilot wire pair between said interface circuit devices and said switchboard, or to a power failure of said switchboard, to automatically convert said underground stations from multiple private party lines to a single channel page and party line.

3. A system as recited in claim 1 wherein said interface circuit devices include means for converting non-permissible signals, voltages and currents normally found in the above-ground dial telephone system to lower voltage and current permissable signals in said underground system such as to prevent the possibility of generating sparks apt to produce explosions in explosive atmospheres.

4. A system as recited in claim 3 wherein said interface devices also include means to convert small control signals from said underground stations to larger signals to satisfy the requirements of said above-ground, dial telephone system.

5. A system as recited in claim 1 wherein each of said interface circuit devices is mounted on a separate card and wherein said cards are mounted in an interface cabinet located above-ground, and wherein the circuitry of each interface card includes a timed holding circuit, activated by an incoming ringing signal to complete a direct current loop of the associated telephone line and initiate circuitry to apply a page bias voltage to the underground station connected to the activated interface card for a predetermined time period, and to initiate additional circuitry superimposing on said lower bias voltage a pulsating ringing tone in said underground station.

6. A system as recited in claim 1 wherein the input to each of said interface circuit devices includes a diode bridge switch to orient the line current to a specific direction, and includes transistor means, together with an optical coupler, to transfer D.C. pulses from said above-ground dial telephone system to said underground dial and page phone stations, which D.C. pulses are integrated in a threshold circuit which initiates a twin timing circuit and ring tone generator, comprising two dual operational amplifiers, by the triggering action of said threshold circuit, the first timing circuit adjusted for a predetermined number of seconds to maintain power and apply paging bias to said private underground lines to switch them to the page mode—the second timing circuit applying power to a ring tone generator comprising the second of said dual operation amplifiers.

7. A system as recited in claim 1 wherein said interface circuit devices are in the form of plug-in cards mounting interface circuits, contained within an above-ground interface cabinet.

8. A system as recited in claim 7 wherein a battery is provided to energize said interface circuit devices in response to a power line failure.

* * * * *